United States Patent
Lan et al.

(10) Patent No.: US 9,039,930 B2
(45) Date of Patent: May 26, 2015

(54) BLUE PHASE LIQUID CRYSTAL DISPLAY PANEL AND FABRICATING METHOD THEREOF

(71) Applicant: Au Optronics Corporation, Hsinchu (TW)

(72) Inventors: Yi-Fen Lan, Taichung (TW); Ling-Yung Wang, Tainan (TW); Pu-Jung Huang, New Taipei (TW); Cheng-Yeh Tsai, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 118 days.

(21) Appl. No.: 13/854,126

(22) Filed: Mar. 31, 2013

(65) Prior Publication Data

US 2014/0002774 A1    Jan. 2, 2014

(30) Foreign Application Priority Data

Jun. 27, 2012 (TW) .............................. 101123015 A (51) Int. Cl.

| | | |
|---|---|---|
| *C09K 19/38* | (2006.01) | |
| *C09K 19/54* | (2006.01) | |
| *C09K 19/12* | (2006.01) | |
| *C09K 19/20* | (2006.01) | |
| *C09K 19/30* | (2006.01) | |
| *G02F 1/1333* | (2006.01) | |
| *C09K 19/02* | (2006.01) | |
| *C09K 19/32* | (2006.01) | |
| *G02F 1/137* | (2006.01) | |
| *C09K 19/04* | (2006.01) | |

(52) U.S. Cl.

CPC ...... *C09K 19/0275* (2013.01); *G02F 1/133365* (2013.01); *C09K 2019/122* (2013.01); *C09K 19/32* (2013.01); *C09K 19/54* (2013.01); *C09K 2019/0448* (2013.01); *C09K 2019/2078* (2013.01); *C09K 2019/3016* (2013.01); *G02F 1/13718* (2013.01); *G02F 2001/13775* (2013.01); *G02F 2001/13793* (2013.01)

(58) Field of Classification Search

CPC .. C09K 19/0275; C09K 19/32; C09K 19/548; C09K 2019/0448; C09K 2019/2078; C09K 2019/3016; C09K 2019/122; G02K 1/1222; G02K 1/13365; G02K 2001/13775; G02K 2001/13793

USPC ............... 252/299.01, 299.5, 299.63, 299.66, 252/299.67; 349/93

See application file for complete search history.

(56) References Cited

U.S. PATENT DOCUMENTS

| | | | |
|---|---|---|---|
| 2008/0259254 A1* | 10/2008 | Kikuchi et al. | .................. 349/88 |
| 2009/0267025 A1* | 10/2009 | Schott et al. | ............... 252/299.2 |
| 2010/0103366 A1* | 4/2010 | Farrand et al. | ................ 349/183 |

FOREIGN PATENT DOCUMENTS

| | | |
|---|---|---|
| CN | 101840097 | 9/2010 |
| CN | 102220143 | 10/2011 |
| TW | 200600880 | 1/2006 |
| TW | I331233 | 10/2010 |
| TW | 201124508 | 7/2011 |
| TW | 201142420 | 12/2011 |

* cited by examiner

*Primary Examiner* — Shean C Wu (74) *Attorney, Agent, or Firm* — Jianq Chyun IP Office (57) ABSTRACT

A blue phase liquid crystal display panel and a fabricating method thereof are provided. A first substrate and a second substrate are provided, and then a blue phase liquid crystal composition is filled between the first substrate and the second substrate, wherein the blue phase liquid crystal composition includes a blue phase liquid crystal and a reactive monomer. Next, an irradiation process is performed to induce a polymerization reaction in the reactive monomer of the blue phase liquid crystal composition, wherein a light utilized in the irradiation process has a wavelength ranged from 200 nm to 350 nm.

22 Claims, 9 Drawing Sheets

BLUE PHASE LIQUID CRYSTAL DISPLAY PANEL AND FABRICATING METHOD THEREOF

CROSS-REFERENCE TO RELATED APPLICATION

This application claims the priority benefit of Taiwan application serial no. 101123015, filed on Jun. 27, 2012. The entirety of the above-mentioned patent application is hereby incorporated by reference herein and made a part of this specification.

BACKGROUND OF THE INVENTION

1. Field of the Invention

The present invention relates to a liquid crystal display panel and a fabricating method thereof, and specifically to a blue phase liquid crystal display panel and a fabricating method thereof.

2. Description of Related Art

In 1888, Friedrich Reinitzer placed cholesteric benzoate in a polarizing microscope and observed that the cholesteric benzoate renders different colors (blue violet and blue) in an isotropic phase and in a cholesteric phase, and a phenomenon of color change between the isotropic phase and the cholesteric phase merely exists in a small temperature range (the temperature range of about only 1° C.). In 1970, many scientists used methods such as volumetric analysis and high-resolution differential scanning calorimetry to verify that the phenomenon is a new thermodynamically stable phase, and called it a blue phase.

The blue phase exists as three different phases, and the three phases are referred to as BP I, BP II and BP III. BP III exists in the highest temperature among the three phases, and BP III is referred to as a "fog phase" in literature. Compared with the cubic structure of BP I and BP II, BP III is amorphous. Observed in the polarizing microscope, BP III is generally a blurred image without any structure, and therefore BP III is difficult to be observed in the polarizing microscope.

On the other hand, it has been verified in the structure of BP I and BP II that a basic unit forming BP I and BP II is double twist cylinders (DTC), and such an arrangement has the smallest free energy. Besides, the double twist cylinders are perpendicular to each other spatially, and such an arrangement leads to lattice defects, and is taken as a pre-transitional phenomenon from a liquid crystal phase to the cholesteric phase. Therefore, blue phases are classified as frustrated phases. Based on Bragg scattering, Kossel diffraction diagram, optical texture, crystal growth, and other experimental researches, it is discovered that BP II has a simple cubic (SC) structure (see Mol. Cryst. Liq. Cryst., Vol. 465, pp. 283-288, 2007), and BP I has a body-centered cubic (BCC) structure. Different from other liquid crystal phases such as nematic phase, smectic phase and isotropic phase, BP I and BP II generally display multiple color patterns of a platelet texture when observed in the polarizing microscope (see J.A.C.S, 2008, 130, 6326 Kikuchi et. al.), and this is due to the Bragg reflection caused by a lattice period in a wavelength range of visible light.

Common liquid crystal is optically anisotropic, but the blue phase is optically isotropic. In other words, the blue phase has a very low or even no birefringence.

Since the lattice period of the blue phase is a function of the wavelength range of visible light, the selective "Bragg reflection" is generated. Such a feature makes the blue phase capable of being applied to fast light modulators. However, no matter in theoretical prediction or experimental observation, a blue phase liquid crystal merely appears in a molecular material with high purity and high optical activity, and therefore the blue phase liquid crystal merely exists within a small temperature range (the temperature range of less than 2° C). Thus, the blue phase liquid crystal is generally discussed merely in the academia, but receives less attention in the field of real applications.

In the last decade, to make a display quality of a liquid crystal display panel surpass the display quality of cathode-ray tubes, the blue phase featuring a fast response again becomes a focus of the academia and the industry. To meet application demands, the blue phase liquid crystal has to be equipped with a wide range of temperature for application, and therefore different technological developments have been proposed successively. For example, a feature of stability of macromolecule (i.e. formation of polymer network) is utilized to generate the blue phase that can exist within a wide range of temperature (see Nature materials, 2002, 1, 64). Besides, in 2002, Kikuchi et al. added a small amount of monomers and photoresist agents into the blue phase liquid crystal, and irradiated the blue phase liquid crystal within the blue phase temperature range to generate a stable blue phase with a gel-like structure, and the blue phase existing within a temperature range of about 60° C. is thus successfully generated.

Although the blue phase liquid crystal has the advantages of fast response time and optical isotropy, it has the disadvantage of relatively high driving voltage, which can reach up to as 55 volts. From the viewpoint of mass production, the high driving voltage of the blue phase liquid crystal is one of the problems demanding solutions.

SUMMARY

The present invention provides a fabricating method of a blue phase liquid crystal display panel, which is capable of fabricating a blue phase liquid crystal display panel having a low driving voltage.

The present invention provides a blue phase liquid crystal display panel, which has a low driving voltage and a short response time.

The present invention introduces a fabricating method of a blue phase liquid crystal display panel, including providing a first substrate and a second substrate. Then, a blue phase liquid crystal composition is filled between the first substrate and the second substrate, wherein the blue phase liquid crystal composition includes a blue phase liquid crystal and a reactive monomer. Next, an irradiation process is performed to induce a polymerization reaction in the reactive monomer of the blue phase liquid crystal composition, wherein a light utilized in the irradiation process having a wavelength of ranged from 200 nm to 350 nm.

The present invention further introduces a blue phase liquid crystal display panel, including a first substrate, a second substrate, and a blue phase liquid crystal composition. The blue phase liquid crystal composition is situated between the first substrate and the second substrate. The blue phase liquid crystal composition includes a blue phase liquid crystal and a polymer formed by a polymerization of a reactive monomer, wherein a molecular weight of the polymer is smaller than $10^5$.

Based on the above, the fabricating method of the blue phase liquid crystal display panel of the present invention includes performing the irradiation process on the blue phase liquid crystal composition using a light of a specific wavelength, so as to induce the polymerization of the reactive monomer in the blue phase liquid crystal composition to form the polymer. The blue phase liquid crystal display panel formed by the fabricating method features a low driving voltage.

In order to make the aforementioned features and advantages of the present invention more comprehensible, embodiments accompanied with figures are described in detail below.

DETAILED DESCRIPTION OF DISCLOSED EMBODIMENTS

Figure 1A:
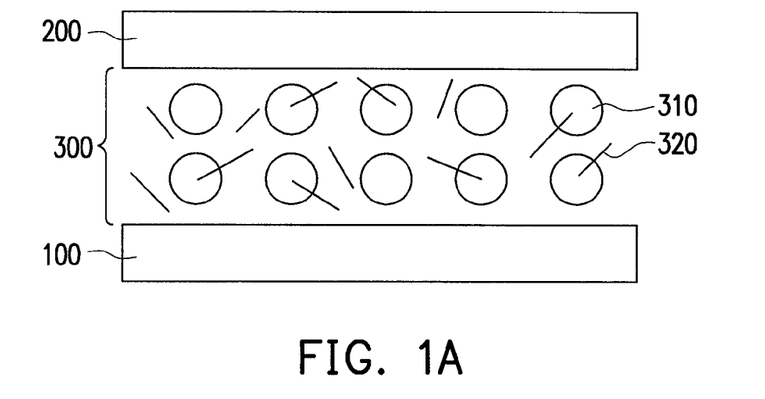
FIGS. 1A to 1C are schematic diagrams of a fabricating process of a blue phase liquid crystal display panel according to an embodiment of the present invention.
Figure 1B:
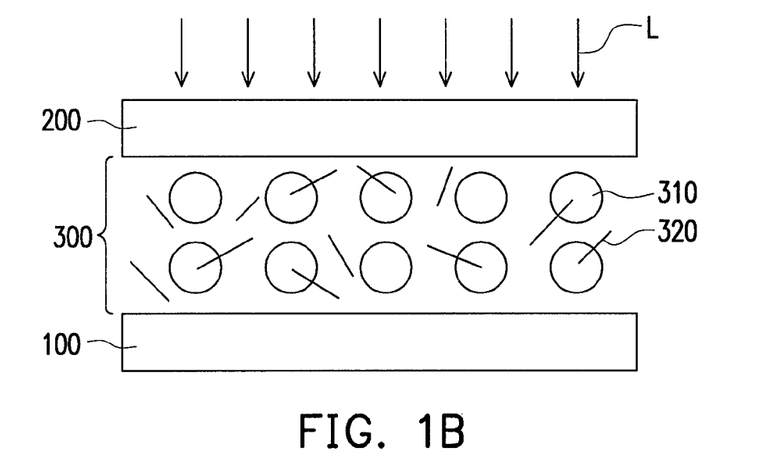
Figure 1C:
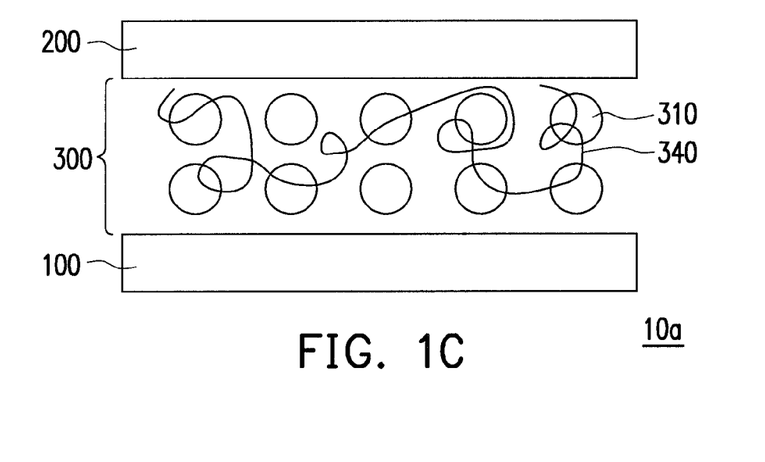

FIGS. 1A to 1C are schematic diagrams of a fabricating process of a blue phase liquid crystal display panel according to an embodiment of the present invention. Referring to FIG. 1A, first of all, a first substrate 100 and a second substrate 200 are provided. The first substrate 100 is an active device array substrate, for example, and the second substrate 200 is a color filter substrate, for example. Then, a blue phase liquid crystal composition 300 is filled between the first substrate 100 and the second substrate 200, wherein the blue phase liquid crystal composition 300 includes a blue phase liquid crystal 310 and a reactive monomer 320.

According to the embodiment, the reactive monomer 320 of the blue phase liquid crystal composition 300 is, for example, 2-ethylhexyl acrylate, or has a structure as shown in Formula 1 or 2.

(Formula 1)

(Formula 2)

According to the embodiment, the blue phase liquid crystal 310 includes a host material and a chiral material, wherein the host material includes, for example, at least one of Formulae 4 to 7.

(Formula 4)

(Formula 5)

-continued (Formula 6)

(Formula 7)

According to the embodiment, the chiral material is, for example, as shown in Formula 8.

(Formula 8)

Referring to FIG. 1B, an irradiation process L is performed to induce a polymerization reaction in the reactive monomer 320 of the blue phase liquid crystal composition 300, so as to obtain a structure as shown in FIG. 1C. A light utilized in the irradiation process L has a wavelength ranged from 200 nm to 350 nm. For instance, the wavelength of the light utilized in the irradiation process L is, for example, 313 nm. After the irradiation process L is performed, the reactive monomer 320 in the blue phase liquid crystal composition 300 is polymerized to form a polymer 340, and a molecular weight of the polymer 340 is smaller than $10^5$.

In the embodiment, the irradiation process L performs irradiation with a light having a single wavelength, but the present invention is not limited thereto. In other embodiments, the irradiation process L performs irradiation with, for example, lights of two wavelengths. In this way, a polydispersity index (PDI) of the polymer formed after irradiation is higher. For instance, the irradiation process L may irradiate the blue phase liquid crystal composition 300 with a light having a wavelength ranged from 200 nm to 350 nm and a light having a wavelength ranged from 350 nm to 400 nm simultaneously; alternatively, the irradiation process L may irradiate the blue phase liquid crystal composition 300 first with the light having the wavelength ranged from 350 nm to 400 nm, and then irradiate with the light having the wavelength ranged from 200 nm to 350 nm; alternatively, the irradiation process L may irradiate the blue phase liquid crystal composition 300 first with the light having the wavelength ranged from 200 nm to 350 nm, and then irradiate with the light having the wavelength ranged from 350 nm to 400 nm.

Specifically, the irradiation process L may irradiate the blue phase liquid crystal composition 300 with a light of a wavelength of 313 nm and a light of a wavelength of 365 nm simultaneously, so as to induce the polymerization of the reactive monomer 320; alternatively, the irradiation process L may irradiate the blue phase liquid crystal composition 300 with the light of the wavelength of 365 nm and the light of the wavelength of 313 nm successively, so as to induce the polymerization of the reactive monomer 320; alternatively, the irradiation process L may irradiate the blue phase liquid crystal composition 300 with the light of the wavelength of 313 nm and the light of the wavelength of 365 nm successively, so as to induce the polymerization of the reactive monomer 320. In this way, the polydispersity index (PDI) of the polymer formed after irradiation is higher than that of the above embodiment.

Besides, the irradiation process L may utilize lights of multiple wavelengths and perform multi-stage irradiation. For instance, the irradiation process L may utilize lights of wavelengths of 365 nm, 350 nm and 313 nm simultaneously, the irradiation process L may utilize lights of wavelengths of 365 nm, 350 nm and 313 nm successively, the irradiation process L may utilize lights of wavelengths of 313 nm, 350 nm and 365 nm successively, or the irradiation process L may utilize lights of wavelengths of 313 nm, 365 nm and 350 nm successively. The present invention is not limited thereto.

In addition, in other embodiments, a heating process may be performed simultaneously with the irradiation process L. Specifically, the irradiation process L is used to induce the polymerization of the reactive monomer 320 in the blue phase liquid crystal composition 300 to form the polymer 340, and the heating process is used to adjust a condition of the polymer 340, such as its shape and position, and to fix the blue phase liquid crystal 310 with the polymer 340.

Thus far, fabrication of a blue phase liquid crystal display panel 10a of the embodiment is completed. Since a molecular weight of the polymer in the embodiment is small, the polymer can be fast driven, and therefore contributes to reducing a driving voltage when starting the blue phase liquid crystal display panel 10a.

Structurally, referring further to FIG. 1C, the blue phase liquid crystal display panel 10a includes the first substrate 100, the second substrate 200 and the blue phase liquid crystal composition 300, wherein the blue phase liquid crystal composition 300 is disposed between the first substrate 100 and the second substrate 200. The blue phase liquid crystal composition 300 includes the blue phase liquid crystal 310 and the polymer 340 formed by polymerization of a reactive monomer, wherein the molecular weight of the polymer is smaller than $10^5$.

In the embodiment, the blue phase liquid crystal composition 300 does not contain any photoinitiator. When the blue phase liquid crystal composition 300 does not contain any photoinitiator, it contributes to reducing a response time of the blue phase liquid crystal display panel 10a in a grey-scale state, but the present invention is not limited thereto. In another embodiment of the present invention, the blue phase liquid crystal composition may also contain a photoinitiator.

Figure 2A:
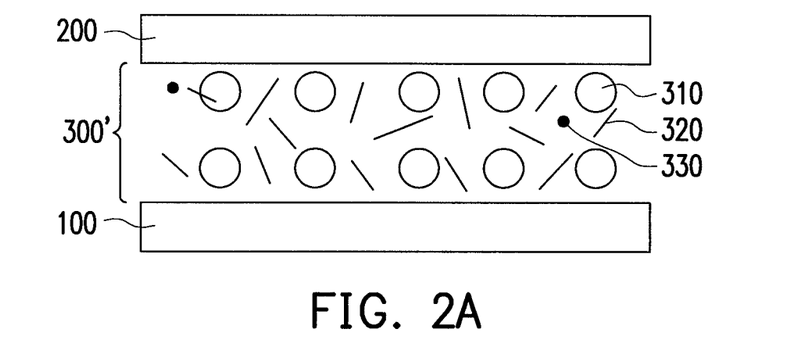
FIGS. 2A to 2C are schematic diagrams of a fabricating process of a blue phase liquid crystal display panel according to another embodiment of the present invention.
Figure 2B:
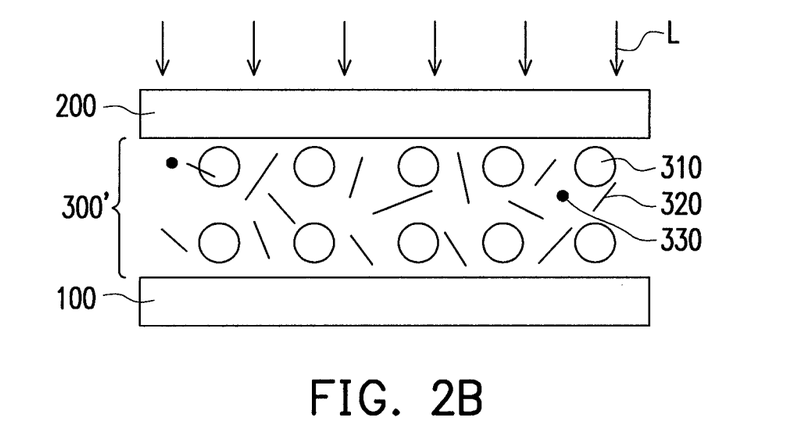
Figure 2C:
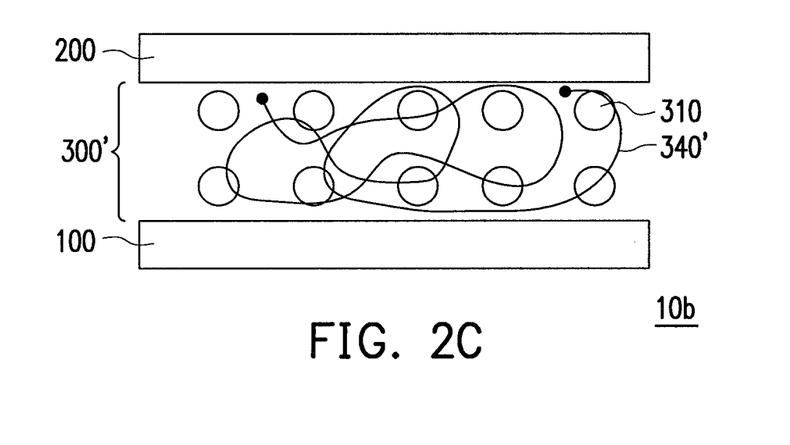

FIGS. 2A to 2C are schematic diagrams of a fabricating process of a blue phase liquid crystal display panel according to another embodiment of the present invention. Since the fabricating process in the embodiment is similar to that in the previous embodiment, identical or similar numerals will be adopted for the same components, and technical content identical with that in the previous embodiment will not be explained repeatedly.

Referring to FIG. 2A, the first substrate 100 and the second substrate 200 are provided. Then, a blue phase liquid crystal composition 300' is filled between the first substrate 100 and the second substrate 200. The blue phase liquid crystal composition 300' includes the blue phase liquid crystal 310 and the reactive monomer 320, wherein the compositions of the blue phase liquid crystal 310 and the reactive monomer 320 may be derived by referring to the previous embodiment.

In the embodiment, the blue phase liquid crystal composition 300' further includes a photoinitiator 330, wherein an amount of the photoinitiator 330 is 0.01~0.1 wt %, for example. The photoinitiator 330 has, for example, a structure as shown in Formula 3.

(Formula 3)

Referring to FIG. 2B, the irradiation process L is performed to induce the reactive monomer 320 in the blue phase liquid crystal composition 300' to perform the polymerization reaction, so as to obtain a structure as shown in FIG. 2C. Specifically, the reactive monomer 320 in the blue phase liquid crystal composition 300' is polymerized to form a polymer 340', and a molecular weight of the polymer 340' is smaller than $10^5$. According to the embodiment, the photoinitiator 330 contributes to promoting the performance of the polymerization.

Thus far, fabrication of a blue phase liquid crystal display panel 10b of the embodiment is completed. Since a molecular weight of the polymer in the embodiment is small, the polymer contributes to reducing a driving voltage when starting the blue phase liquid crystal display panel 10b.

Structurally, referring further to FIG. 2C, the blue phase liquid crystal display panel 10b includes the first substrate 100, the second substrate 200 and the blue phase liquid crystal composition 300', wherein the blue phase liquid crystal composition 300' is disposed between the first substrate 100 and the second substrate 200. The blue phase liquid crystal composition 300' includes the blue phase liquid crystal 310 and the polymer 340' formed by polymerization of the reactive monomer, wherein the molecular weight of the polymer is smaller than $10^5$.

Evaluation of the Blue Phase Liquid Crystal Display Panel

Most of the prior art utilizes an irradiation process with the light of the wavelength of 365 nm to fabricate the blue phase liquid crystal display panel, while the present invention changes the wavelength of the light utilized in the irradiation process in order to further reduce the driving voltage of the blue phase liquid crystal display panel. Several examples and comparative examples are listed below to describe the advantages of the blue phase liquid crystal display panel of the present invention.

In Example 1 and Comparative Example 1, 4-cyano-4'-pentyl biphenyl, alkyl-4-cyclohexanyl-1',4'-fluoro-biphene, and dialkoxyl banana core phenyl are adopted as the blue phase liquid crystal; diacrylate monomer and trimethylolpropane triacrylate are adopted as the reactive monomer; 2,2-dimethoxy-2-phenyl acetophenone is adopted as the photoinitiator. Example 1 and Comparative Example 1 are fabricated with roughly identical materials, the only difference being that in fabricating the blue phase liquid crystal display panel, the wavelength of the light utilized in the irradiation process in Example 1 is 313 nm, while the wavelength of the light utilized in the irradiation process in Comparative Example 1 is 365 nm.

Figure 3:
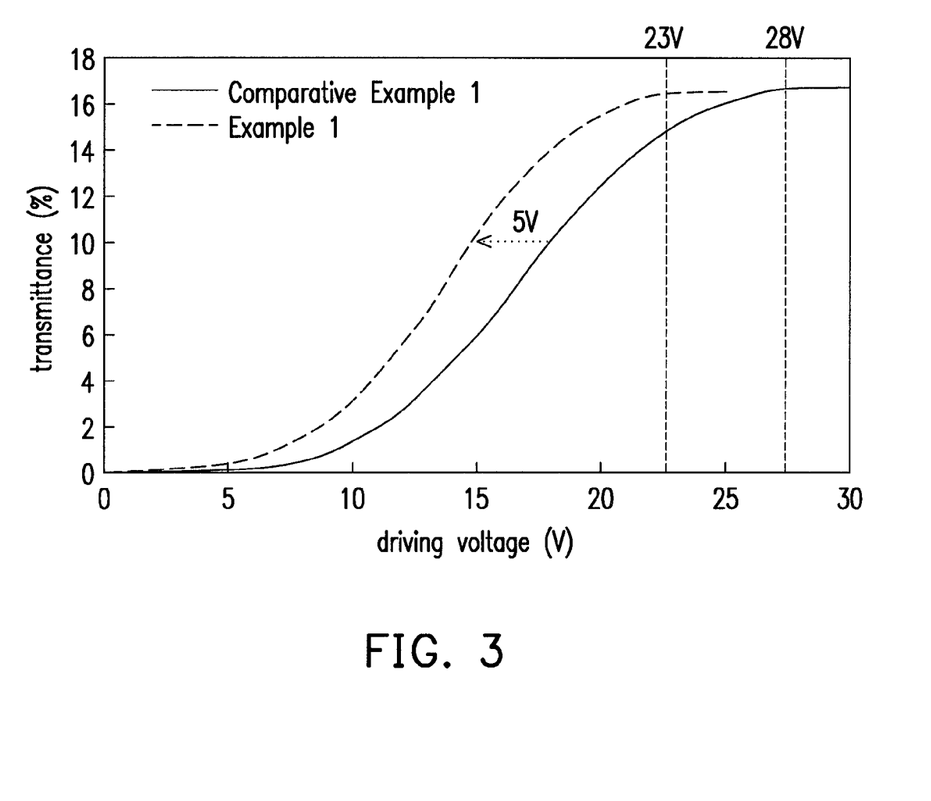
FIG. 3 is a diagram showing a relationship of transmittance to driving voltage according to Example 1 and Comparative Example 1 of the present invention.

FIG. 3 is a diagram showing a relationship of transmittance to driving voltage according to Example 1 and Comparative Example 1 of the present invention. Referring to FIG. 3, the driving voltage of the blue phase liquid crystal display panel in Example 1 is about 23 V, while the driving voltage of the blue phase liquid crystal display panel in Comparative Example 1 is about 28 V. On average, the driving voltage in Example 1 is lower than the driving voltage in Comparative Example 1 about 5 V. Accordingly, it can be known that in fabrication of the blue phase liquid crystal display panel, when the irradiation process utilizes the light of the wavelength of 313 nm to polymerize a reactive monomer to form a polymer, and the driving voltage of the blue phase liquid crystal display panel having the polymer may be reduced.

Figure 4:
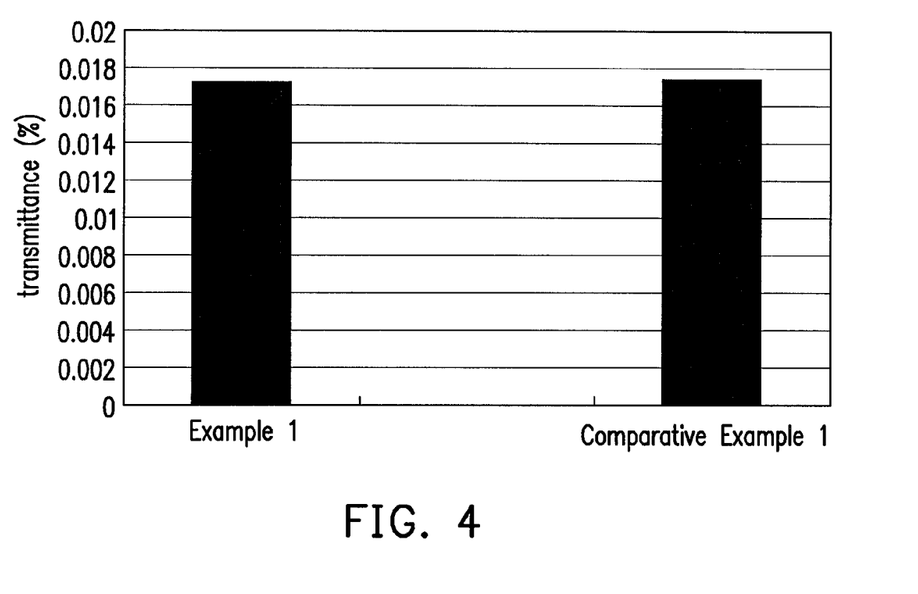
FIG. 4 is a diagram showing a relationship regarding black state according to Example 1 and Comparative Example 1 of the present invention.
Figure 5:
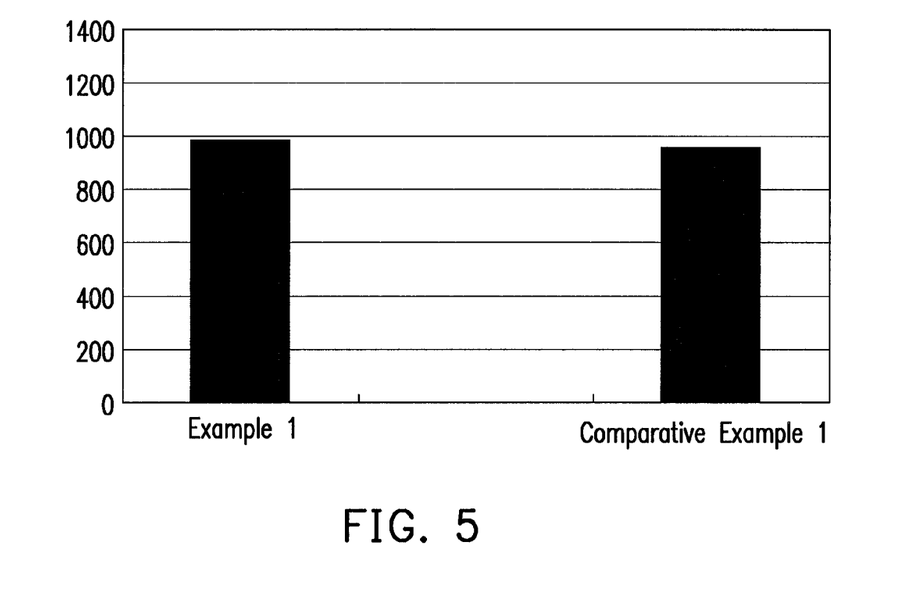
FIG. 5 is a diagram showing a relationship regarding contrast according to Example 1 and Comparative Example 1 of the present invention.
Figure 6:
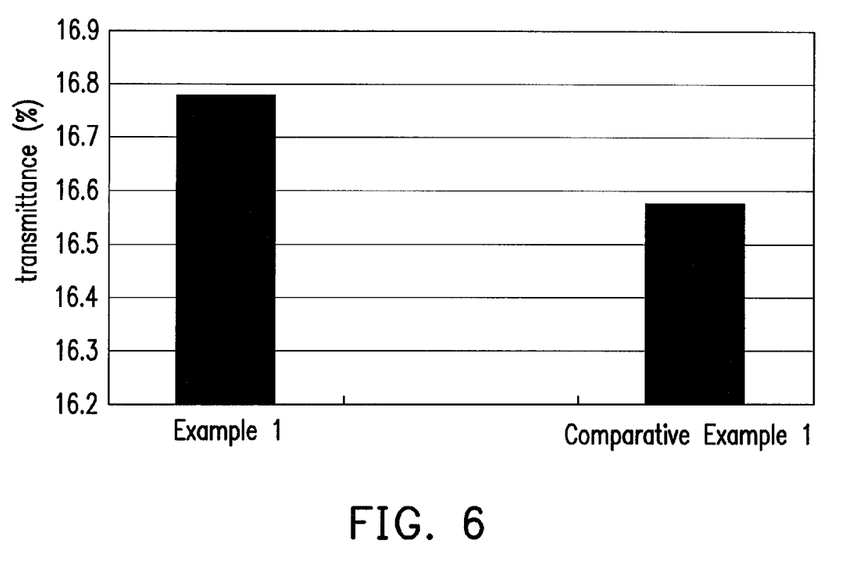
FIG. 6 is a diagram showing a relationship regarding white state according to Example 1 and Comparative Example 1 of the present invention.
Figure 7:
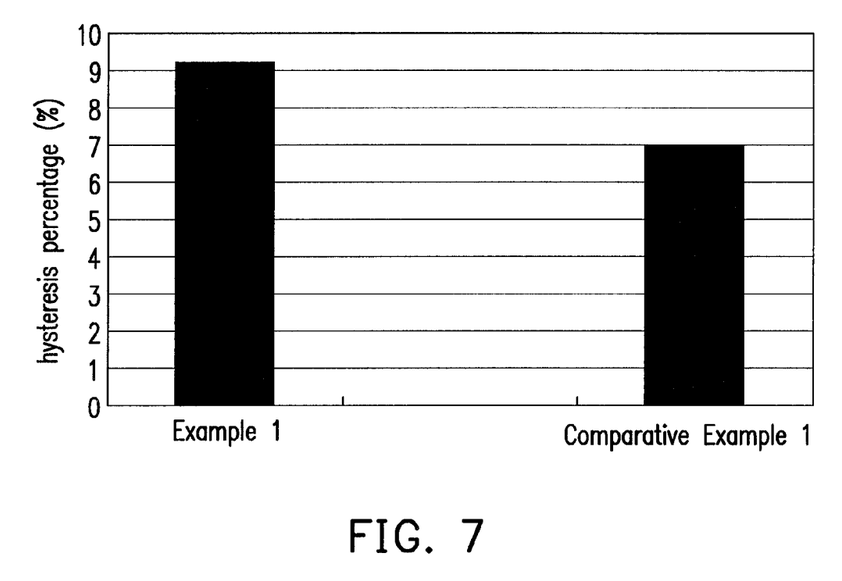
FIG. 7 is a diagram showing a relationship regarding hysteresis according to Example 1 and Comparative Example 1 of the present invention.

FIG. 4 is a measurement result of dark state under saturation voltage according to Example 1 and Comparative Example 1 of the present invention. The horizontal axis is unitless, and the vertical axis represents the transmittance (%). FIG. 5 is a measurement result of contrast under saturation voltage according to Example 1 and Comparative Example 1 of the present invention. Both the horizontal axis and the vertical axis are unitless. FIG. 6 is a measurement result of white state under saturation voltage according to Example 1 and Comparative Example 1 of the present invention. The horizontal axis is unitless, and the vertical axis represents the transmittance (%). FIG. 7 is a measurement result of hysteresis under saturation voltage according to Example 1 and Comparative Example 1 of the present invention. The horizontal axis is unitless, and the vertical axis represents the hysteresis percentage (%). From FIGS. 4 to 7 it can be seen that by fabricating the blue phase liquid crystal display panel by the irradiation process with the light of the wavelength of 313 nm, not only the driving voltage of the blue phase liquid crystal display panel is reduced, but also good optical properties of the blue phase liquid crystal display panel are maintained.

In Example 2 and Comparative Example 2, 4-cyano-4'-pentyl biphenyl, alkyl-4-cyclohexanyl-1',4'-fluoro-biphene, and difluoro-dialkoxyl banana core phenyl are adopted as the blue phase liquid crystal; diacrylate monomer and trimethylolpropane triacrylate are adopted as the reactive monomer; 2,2-dimethoxy-2-phenyl acetophenone is adopted as the photoinitiator. In Example 3 and Comparative Example 3, 4-cyano-4'-pentyl biphenyl, alkyl-4-cyclohexanyl-1',4'-fluoro-biphene, and fluoro-dialkoxyl phenyl are adopted as the blue phase liquid crystal; diacrylate monomer and trimethylolpropane triacrylate are adopted as the reactive monomer; 2,2-dimethoxy-2-phenyl acetophenone is adopted as the photoinitiator. The wavelength of the light in the irradiation process in Example 2 and Example 3 is 313 nm, while the wavelength of the light in the irradiation process in Comparative Example 2 and Comparative Example 3 is 365 nm.

Figure 8:
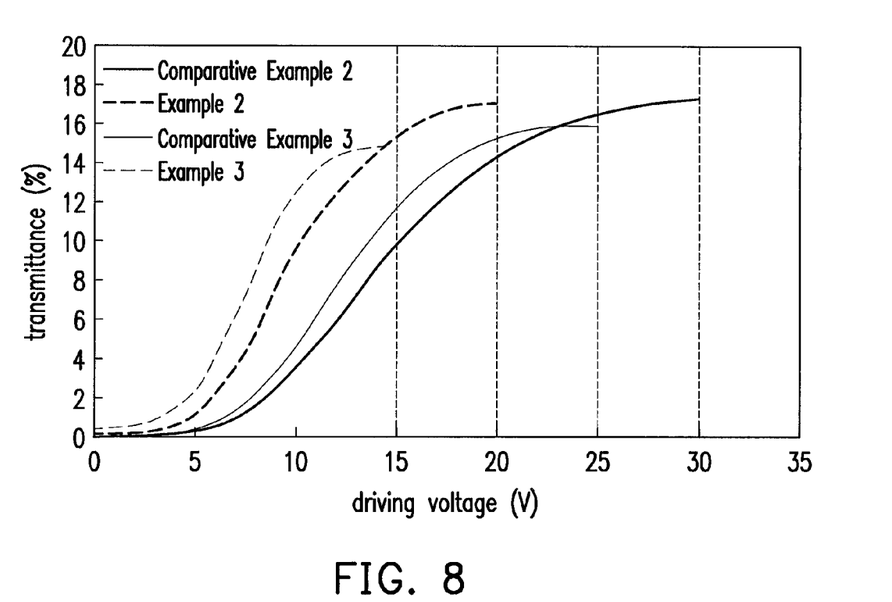
FIG. 8 is a diagram showing a relationship of transmittance to driving voltage according to blue phase liquid crystal display panels in Example 2, Comparative Example 2, Example 3, and Comparative Example 3.

FIG. 8 is a diagram showing a relationship of transmittance to driving voltage according to the blue phase liquid crystal display panel in Example 2, Comparative Example 2, Example 3, and Comparative Example 3. Referring to FIG. 8, the driving voltage in Example 2 is about 20 V, the driving voltage in Comparative Example 2 is about 30 V, the driving voltage in Example 3 is about 15 V, and the driving voltage in Comparative Example 3 is about 25 V. Therefore, the driving voltages in Example 2 and Example 3 are lower than the driving voltages in Comparative Example 2 and Comparative Example 3. Accordingly, it can be known that the irradiation process utilizing the light of the wavelength of 313 nm can indeed fabricate the blue phase liquid crystal display panel having a low driving voltage.

Generally, the blue phase liquid crystal display panel using the blue phase liquid crystal composition having a polymer has a fast response speed when a saturation voltage is applied. The response time is 0.1 to 10 ms, for example. In addition, the response time of the blue phase liquid crystal display panel in a grey-scale state is 5 to 30 ms, for example.

In order to further reduce the response time of the blue phase liquid crystal display panel in the grey-scale state, the present invention adopts the blue phase liquid crystal composition without a photoinitiator in fabricating the blue phase liquid crystal display panel.

In Example 4, Comparative Example 4, Example 5 and Comparative Example 5, 4-cyano-4'-pentyl biphene, alkyl-4-cyclohexanyl-1',4'-fluoro-biphene, and fluoro-dialkoxyl banana core phenyl are adopted as the blue phase liquid crystal. In Example 4, Comparative Example 4, Example 5 and Comparative Example 5, diacrylate monomer and trimethylolpropane triacrylate are adopted as the reactive monomer. Example 5 and Comparative Example 5 do not utilize a photoinitiator. The wavelength of the light in the irradiation process in Example 4 and Example 5 is 313 nm, and the wavelength of the light in the irradiation process in Comparative Example 4 and Comparative Example 5 is 365 nm.

Figure 9:
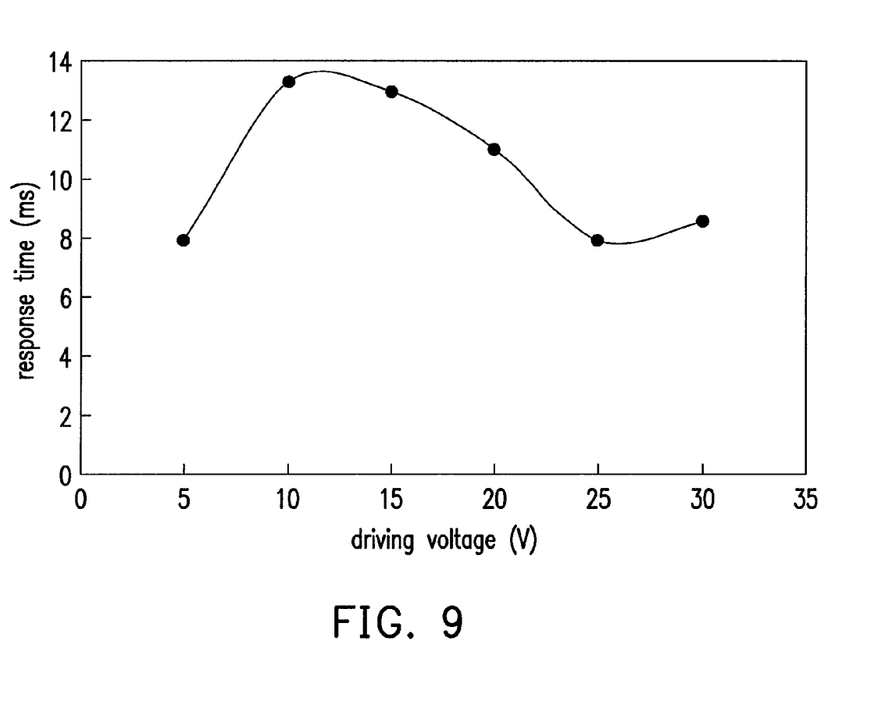
FIG. 9 is a diagram showing a relationship of response time to driving voltage according to a blue phase liquid crystal display panel in Comparative Example 4.
Figure 10:
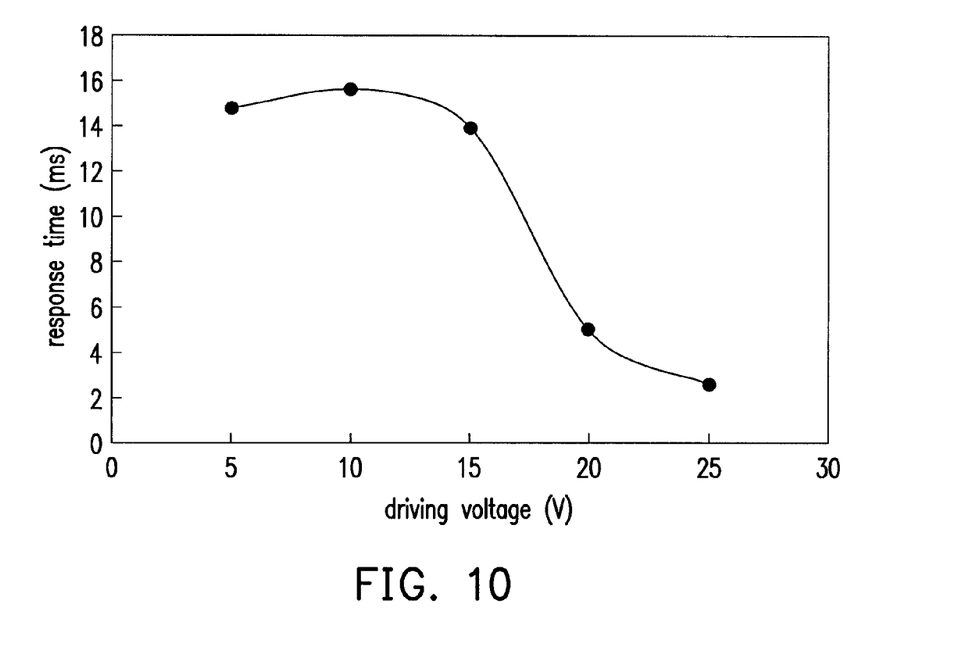
FIG. 10 is a diagram showing a relationship of response time to driving voltage according to a blue phase liquid crystal display panel in Example 4.
Figure 11:
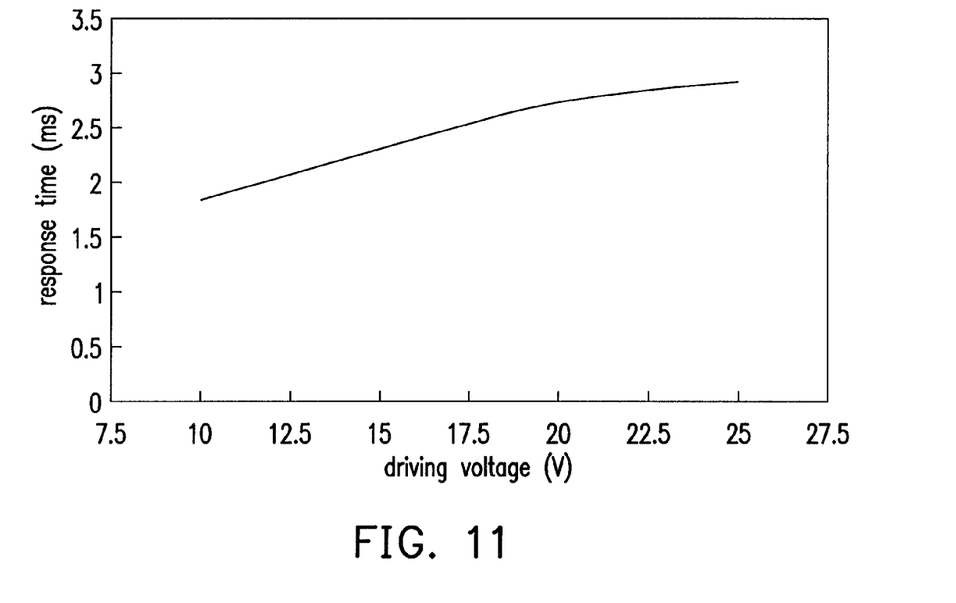
FIG. 11 is a diagram showing a relationship of response time to driving voltage according to a blue phase liquid crystal display panel in Comparative Example 5.
Figure 12:
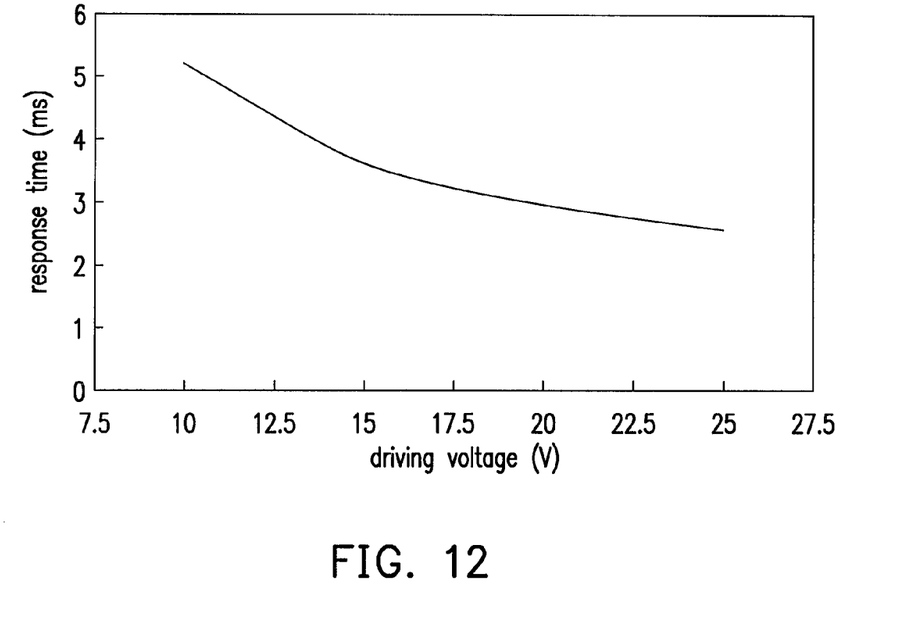
FIG. 12 is a diagram showing a relationship of response time to driving voltage according to a blue phase liquid crystal display panel in Example 5.
Figure 13:
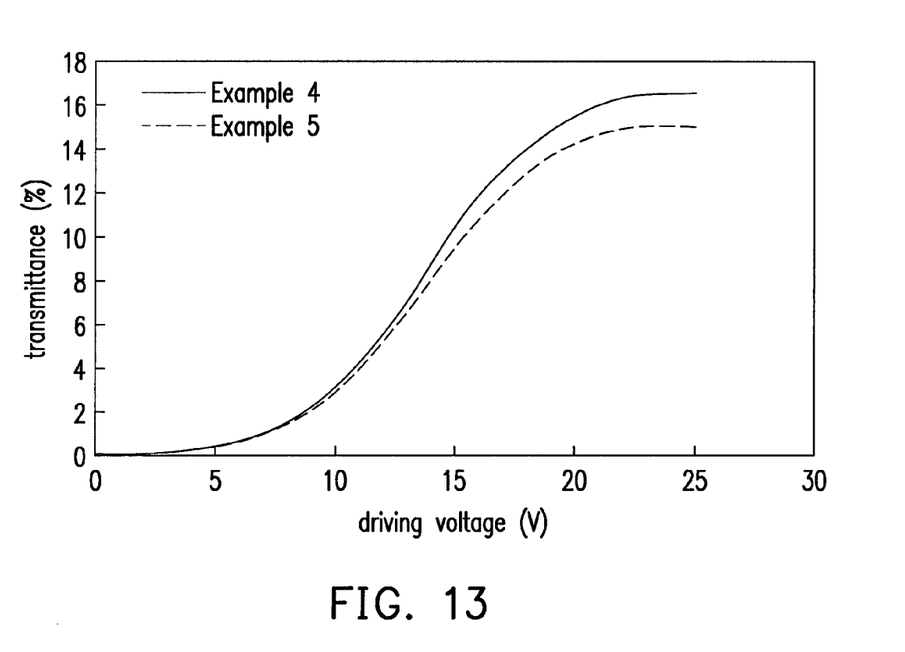
FIG. 13 is a diagram showing a relationship of transmittance to driving voltage according to Example 4 and Example 5 of the present invention.

FIG. 9 is a diagram showing a relationship of response time to driving voltage according to the blue phase liquid crystal display panel in Comparative Example 4. FIG. 10 is a diagram showing a relationship of response time to driving voltage according to the blue phase liquid crystal display panel in Example 4. FIG. 11 is a diagram showing a relationship of response time to driving voltage according to the blue phase liquid crystal display panel in Comparative Example 5. FIG. 12 is a diagram showing a relationship of response time to driving voltage according to the blue phase liquid crystal display panel in Example 5. FIG. 13 is a diagram showing a relationship of transmittance to driving voltage according to Example 4 and Example 5.

Referring simultaneously to FIGS. 9, 10, 11 and 12, the response time of the blue phase liquid crystal display panel with a photoinitiator (see FIGS. 9 and 10) is longer than that of the blue phase liquid crystal display panel without a photoinitiator (see FIGS. 11 and 12). In other words, the blue phase liquid crystal display panel without using a photoinitiator has a faster response time. Besides, although the blue phase liquid crystal display panels in both Comparative Example 5 and Example 5 respond faster, a time required for the irradiation process in Example 5 is merely 3 minutes, while time required for the irradiation process in Comparative Example 5 is 6 minutes. Therefore, with regard to the fabricating process, the irradiation process utilizing the light of the wavelength of 313 nm indeed is advantageous to the fabrication of the blue phase liquid crystal display panel. In addition, as demonstrated in FIG. 13, there will be not much effect on the driving voltage and the transmittance of blue phase liquid crystal display when a photoinitiator is absent.

Besides, the irradiation process may irradiate merely with the light of the wavelength of 313 nm; it may irradiate with the lights of the wavelengths of 313 nm and 365 nm simultaneously; or it may irradiate with the light of the wavelength of 365 nm first, and then irradiate with the light of the wavelength of 313 nm. Below are several examples and comparative examples for explanation. The irradiation process in Comparative Example 6 utilizes the light of the wavelength of 365 nm; the irradiation process in Example 6 utilizes the light of the wavelength of 313 nm; the irradiation process in Example 7 irradiates with the lights of the wavelengths of 365 nm and 313 nm simultaneously; the irradiation process in Example 8 irradiates with the light of the wavelength of 365 nm first, and then with the light of the wavelength of 313 nm. In addition, the reactive monomer utilized in Comparative Example 6 and Examples 6, 7 and 8 is 2-ethylhexyl acrylate, different from that in Comparative Examples 1~5 and Examples 1~5.

Figure 14:
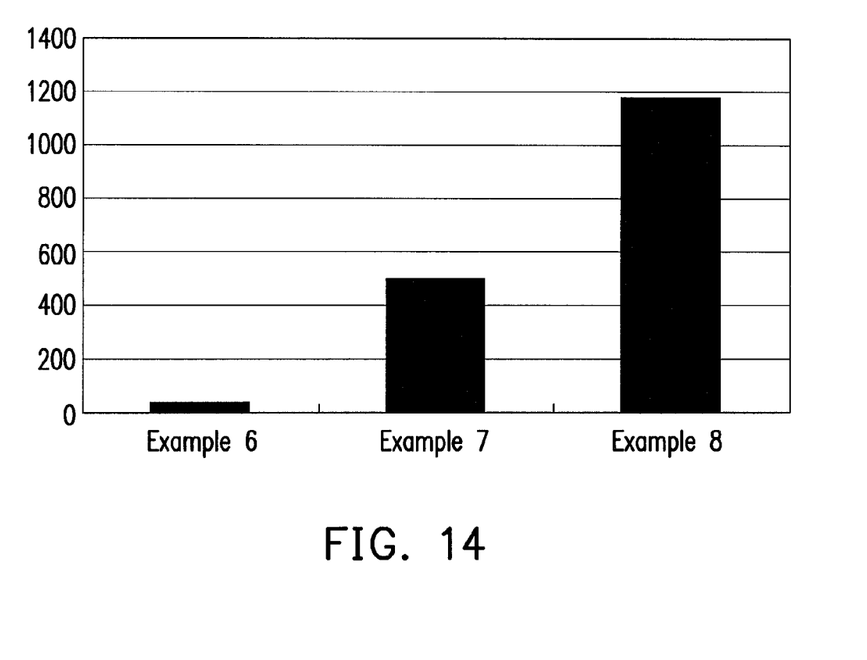
FIG. 14 shows a measurement result of contrast ratio in Examples 6, 7 and 8.
Figure 15:
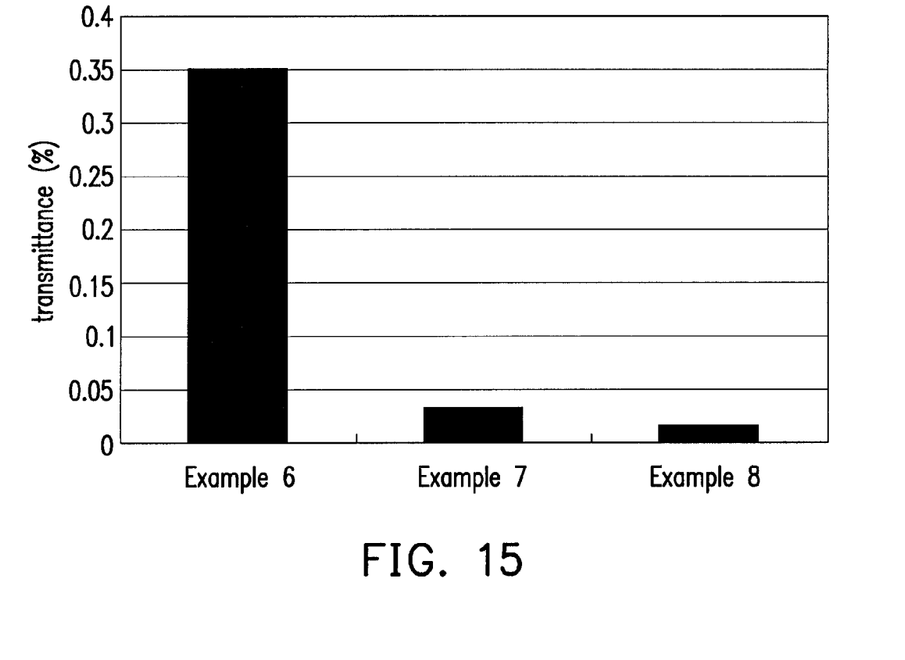
FIG. 15 shows a measurement result of black state in Examples 6, 7 and 8.

Table 1 presents the polydispersity index (PDI) of Comparative Example 6 and Examples 6, 7 and 8. FIG. 14 is a measurement result of contrast ratio under saturation voltage in Examples 6, 7 and 8. Both the horizontal axis and the vertical axis are unitless. FIG. 15 is a measurement result of dark state under saturation voltage in Examples 6, 7 and 8. The horizontal axis is unitless and the vertical axis represents the transmittance (%).

TABLE 1

| Wavelength | PDI (x) |
| --- | --- |
| Comparative Example 6 | $1 < x \leq 1.5$ |
| Example 6 | $1 < x \leq 1.5$ |
| Example 7 | $x > 1.5$ |
| Example 8 | $x > 1.5$ |

As demonstrated in Table 1, when irradiating the blue phase liquid crystal composition simultaneously with the lights of the wavelengths of 313 nm and 365 nm in the irradiation process, the polydispersity index of the polymer thus formed is larger than 1.5. Additionally, when irradiating the blue phase liquid crystal composition first with the light of the wavelength of 365 nm, and then with the light of the wavelength of 313 nm in the irradiation process, the polydispersity index of the polymer thus formed is larger than 1.5. In other words, when the irradiation process utilizes lights of two wavelengths (313 nm and 365 nm) to irradiate the blue phase liquid crystal composition, a polymer with a higher polydispersity index can be formed. The higher the polydispersity index, the more significant the difference between macromolecule chain lengths, the polymer being more capable of stabilizing the blue phase liquid crystal, and further improving the dark state and the contrast.

Referring to FIG. 14, when the irradiation process utilizes the lights of two wavelengths (313 nm and 365 nm) simultaneously to irradiate the blue phase liquid crystal composition, the contrast ratio of the blue phase liquid crystal display panel may be enhanced. Especially when the irradiation process utilizes the light of the wavelength of 365 nm first and then the light of the wavelength of 313 nm to irradiate the blue phase liquid crystal composition, the contrast ratio of the blue phase liquid crystal display panel may be further enhanced, in order that the blue phase liquid crystal display panel has a good display effect.

Referring to FIG. 15, when the irradiation process utilizes the lights of two wavelengths (313 nm and 365 nm) simultaneously to irradiate the blue phase liquid crystal composition, the dark state of the blue phase liquid crystal display panel may be reduced. Especially when the irradiation process utilizes the light of the wavelength of 365 nm first and then the light of the wavelength of 313 nm to irradiate the blue phase liquid crystal composition, the dark state of the blue phase liquid crystal display panel may be further reduced, in order that the blue phase liquid crystal display panel has a good display effect.

In light of the above, the fabricating method of the blue phase liquid crystal display panel of the present invention includes performing the irradiation process on the blue phase liquid crystal composition with a light of a specific wavelength, so as to induce the polymerization of the reactive monomer in the blue phase liquid crystal composition to form the polymer. By using the polymer as the blue phase liquid crystal composition, the driving voltage of the blue phase liquid crystal panel may be reduced.

Although the present invention is described with the embodiments above, the present invention is not limited thereto. It will be apparent to those skilled in the art that various modifications and variations can be made to the structure of the disclosed embodiments without departing from the spirit and scope of the present invention. Therefore, the scope of the present invention is defined in the claims below.

What is claimed is:

1. A fabricating method of a blue phase liquid crystal display panel, comprising:
   providing a first substrate and a second substrate;
   filling a blue phase liquid crystal composition between the first substrate and the second substrate, wherein the blue phase liquid crystal composition comprises a blue phase liquid crystal and a reactive monomer; and
   performing an irradiation process to induce a polymerization reaction in the reactive monomer of the blue phase liquid crystal composition to form a polymer, wherein a light utilized in the irradiation process has a wavelength ranged from 200 nm to 350 nm.

2. The fabricating method of the blue phase liquid crystal display panel according to claim 1, wherein the wavelength of the light utilized in the irradiation process is substantially 313 nm.

3. The fabricating method of the blue phase liquid crystal display panel according to claim 1, wherein the irradiation process further comprises utilizing a light having a wavelength ranged from 350 nm to 400 nm.

4. The fabricating method of the blue phase liquid crystal display panel according to claim 3, wherein the irradiation process comprises irradiating with the light having the wavelength ranged from 200 nm to 350 nm and irradiating with the light having the wavelength ranged from 350 nm to 400 nm simultaneously.

5. The fabricating method of the blue phase liquid crystal display panel according to claim 3, wherein the irradiation process comprises irradiating with the light having the wavelength ranged from 350 nm to 400 nm first, and then irradiating with the light having the wavelength ranged from 200 nm to 350 nm.

6. The fabricating method of the blue phase liquid crystal display panel according to claim 3, wherein the irradiation process comprises irradiating with the light having the wavelength ranged from 200 nm to 350 nm first, and then irradiating with the light having the wavelength ranged from 350 nm to 400 nm.

7. The fabricating method of the blue phase liquid crystal display panel according to claim 3, wherein a polydispersity index (PDI) of the polymer formed by the reactive monomer in the blue phase liquid crystal composition after the polymerization is larger than 1.5.

8. The fabricating method of the blue phase liquid crystal display panel according to claim 1, wherein the blue phase liquid crystal composition does not contain any photoinitiator.

9. The fabricating method of the blue phase liquid crystal display panel according to claim 1, wherein the reactive monomer in the blue phase liquid crystal composition comprises 2-ethylhexyl acrylate or a structure represented by Formula 1 or 2:

(Formula 1)

(Formula 2)

10. The fabricating method of the blue phase liquid crystal display panel according to claim 1, wherein the blue phase liquid crystal composition further comprises a photoinitiator represented by Formula 3:

(Formula 3)

11. The fabricating method of the blue phase liquid crystal display panel according to claim 1, wherein the blue phase liquid crystal in the blue phase liquid crystal composition comprises a host material and a chiral material.

12. The fabricating method of the blue phase liquid crystal display panel according to claim 11, wherein the host material comprises at least one of Formulae 4 to 7:

(Formula 4)

(Formula 5)

(Formula 6)

(Formula 7)

13. The fabricating method of the blue phase liquid crystal display panel according to claim 11, wherein the chiral material is represented by Formula 8:

(Formula 8)

14. The fabricating method of the blue phase liquid crystal display panel according to claim 1, wherein a molecular weight of the polymer in the blue phase liquid crystal composition after the polymerization is smaller than $10^5$.

15. The fabricating method of the blue phase liquid crystal display panel according to claim 1, wherein further comprising performing a heating process simultaneously with performing the irradiation process.

16. A blue phase liquid crystal display panel, comprising:
a first substrate and a second substrate; and
a blue phase liquid crystal composition disposed between the first substrate and the second substrate, the blue phase liquid crystal composition comprising a blue phase liquid crystal and a polymer formed by a polymerization of a reactive monomer, wherein a molecular weight of the polymer is smaller than $10^5$.

17. The blue phase liquid crystal display panel according to claim 16, wherein a polydispersity index of the polymer is larger than 1.5.

18. The blue phase liquid crystal display panel according to claim 16, wherein the reactive monomer for forming the polymer comprises 2-ethylhexyl acrylate or a structure represented by Formula 1 or 2:

(Formula 1)

(Formula 2)

19. The blue phase liquid crystal display panel according to claim 16, wherein the blue phase liquid crystal comprises a host material and a chiral material.

20. The blue phase liquid crystal display panel according to claim 19, wherein the host material comprises at least one of Formulae 4 to 7:

(Formula 4)

(Formula 5)

-continued (Formula 6)

(Formula 7)

21. The blue phase liquid crystal display panel according to claim 19, wherein the chiral material is represented by Formula 8:

(Formula 8)

22. The blue phase liquid crystal display panel according to claim 16, wherein the blue phase liquid crystal composition does not contain any photoinitiator.

* * * * *